United States Patent [19]

Dollarhide

[11] 3,760,880

[45] Sept. 25, 1973

[54] CONSOLIDATION OF PARTICULATE MATERIALS LOCATED IN EARTHEN FORMATIONS

[75] Inventor: Francis E. Dollarhide, Tulsa, Okla.

[73] Assignee: The Dow Chemical Company, Midland, Mich.

[22] Filed: June 1, 1972

[21] Appl. No.: 258,601

[52] U.S. Cl. .............................. 166/276, 166/295
[51] Int. Cl. ...................................... E21b 43/04
[58] Field of Search ..................... 166/276, 295; 61/36 R

[56] References Cited
UNITED STATES PATENTS

| | | | |
|---|---|---|---|
| 2,674,323 | 4/1954 | Cardwell | 166/276 |
| 2,823,753 | 2/1958 | Henderson et al. | 166/276 X |
| 2,941,594 | 6/1960 | Ladd et al. | 166/276 |
| 2,981,334 | 4/1961 | Powell, Jr. | 166/276 |
| 2,986,538 | 5/1961 | Nesbitt et al. | 166/276 X |
| 3,548,942 | 12/1970 | Terry | 166/276 |
| 3,580,338 | 5/1971 | Sparlin | 166/276 |
| 3,621,915 | 11/1971 | Bruist et al. | 166/276 |
| 3,221,814 | 12/1965 | Hower | 166/295 |
| 3,285,339 | 11/1966 | Walther et al. | 166/295 |
| 3,297,089 | 1/1967 | Spain | 166/295 |

*Primary Examiner*—Stephen J. Novosad
*Attorney*—William M. Yates et al.

[57] ABSTRACT

A consolidating composition and a method is provided for placing a consolidated mass of particles in a borehole having high compressive strengths and being permeable to the flow of fluids. The consolidating composition comprises a mixture produced by sequentially mixing together, (1) particulate solids and a carrier liquid and (2) an uncured aldehyde-hydroxylaryl resin dissolved in a solvent which itself is soluble in said carrier liquid. Alternatively the resin solution and particulate material can be simultaneously mixed into the carrier, e.g., the resin and particles are premixed and then introduced into a carrier liquid.

10 Claims, No Drawings

CONSOLIDATION OF PARTICULATE MATERIALS LOCATED IN EARTHEN FORMATIONS

BACKGROUND OF THE INVENTION

It is often desired to prevent the movement of particulate materials from loose or incompetent earthen formations, for example, to prevent wind and water erosion and to prevent the production of particulate materials, e.g., sand, clay, etc., from subterranean formations through an oil, gas, etc., wellbore. It is, however, often necessary to consolidate these formations in such a manner that the flow of fluid therethrough is not greatly restricted. This is especially important in oil and gas wells since it is desired that the production of fluid hydrocarbons can be continued from the formation after is has been consolidated. Two commonly used techniques employed for consolidating such formations are gravel packing and plastic in situ consolidation. In another technique granular particles are coated with various plastic formulations and the plastic coated particles suspended into a hydrocarbon carrier liquid. The suspension is pumped into a borehole to form a pack which is cured by subsequent flushing with a curing agent or with a curing agent included in the suspension. Such techniques are taught in U. S. Pat. Nos. 3,404,735, 3,391,738 and 3,621,915.

SUMMARY OF THE INVENTION

The present invention is based on the discovery that a superior consolidation of incompetent formations can be achieved by forcing into contact with an exposed surface of the incompetent formation a consolidating material prepared in the following manner. The particulate solids are first suspended in a carrier liquid. Then there is mixed with the suspended solids a solution of an unset resin comprising a reaction product of a low molecular weight hydroxyaryl compound and an aldehyde. The solvent for the resin is substantially completely soluble in the carrier liquid. The particles become coated with the resin and after emplacement in the formation the resin can be set by contacting the coated particles with a resin setting catalyst or the resin can be allowed to set by itself. Setting of the resin is accelerated by an elevated temperature of greater than about 70°F. Superior consolidated material is prepared by employing a liquid hydrocarbon soluble solvent and mixing the particles into the liquid hydrocarbon prior to mixing in the resin material. Alternatively, the resin solution and particles may be premixed and the resulting resin-particle mixture introduced into a carrier liquid, i.e., the resin solution and particles are simultaneously introduced into the carrier liquid.

DETAILED DESCRIPTION OF THE INVENTION

Any particulate material which is unreactive with the other constituents of the invention can be employed. Nut shells, hard synthetic resins, gilsonite, fruit pits, sand, glass beads, particulate metals or the like are illustrative of suitable materials. The size of the particles is not critical.

The resin can be any unset resin which is formed by the reaction of an aldehyde and a low molecular weight hydroxyaryl compound. Preferably the resin is soluble in a solvent which is soluble in a hydrocarbon carrier liquid. The resin must also set to form a bond between coated particles. Examples of suitable aldehydes are formaldehyde, acetaldehyde, propanaldehyde or mixtures thereof. Exemplary of suitable low molecular weight hydroxyaryl compounds are phenol, cresol, betanaphthol, resorcinol, cresylic acid or mixtures thereof. The resin is classified in the art as a stage A resin which is a partially condensed liquid resin until catalyzed to accelerate further condensation and set. Reference may be made to U. S. Pat. No. 3,305,017, column 3, line 7 through column 4, line 33 for a description of how to prepare a resin useful in the practice of the invention. The teachings of this patent are specifically incorporated herein by reference.

Any solvent for the resin may be employed which is itself soluble in the liquid hydrocarbon carrier oil. Preferred are oil miscible alcohols which are liquid at ambient temperatures. Included by way of example are aliphatic mono-alcohols containing from four to eight carbon atoms. The alcohol may be straight chain or branched and the solvent may comprise more than one such alcohol. Exemplary alcohols which can be employed are t-butyl alcohol, n-butyl alcohol, amyl alcohol, caprylic alcohol, isopropyl alcohol and mixtures thereof. It has also been discovered that the addition of an aromatic hydrocarbon in which the resin is soluble improves the extraction of the oil soluble solvent into the carrier liquid. Furfuryl alcohol is not suitable as the major component of the solvent when the hydrocarbon liquid is kerosene.

The hydrocarbon carrier liquid is any liquid, preferably of an oily nature, in which the oil soluble solvent (E.G., alcohol) employed for the resin is soluble. Exemplary of such liquids are hydrocarbon oils, e.g., gas oil, diesel oil, crude oil, fuel oil, kerosene, gasoline, hexane, mixtures thereof and the like.

As previously indicated, in addition to the oil miscible solvent, a substantially oil immiscible solvent, e.g., ethanol, furfuryl alcohol, or acetone, may be included in the composition in a small amount to aid in providing a lump free even dispersion of the resin coated particles in the carrier liquid. One percent or less, by weight of the mixture, of such solvent is preferred since such solvents tend to weaken the hardened set resins if present in too great a quantity. Preferably if employed the non-carrier liquid soluble solvent is employed in an amount between about 0.4 and 0.6 percent by weight of the mixture.

Also there may be employed in the practice of the invention, as an optional ingredient, certain agents which enhance the bond between the set resin and the particle which it coats. These agents, commonly known as coupling agents, are well known in the art. With particulate sand, certain silanes, such as gamma-aminopropyltriethoxy silane, can be employed. These coupling agents can be added to the carrier liquid, the resinous solution, or can be added to a separate fluid which is contacted with the coated particles after they have been placed in contact with an incompetent formation. U. S. Pat. Nos. 3,497,010, 3,282,338, 3,285,339, 3,297,086 and 3,343,386 describe other coupling agents which can be employed. The teachings of these patents are specifically incorporated herein by reference.

After the coated particles are emplaced, they can be contacted with an external catalyst, e.g., present in an over-flush fluid, to accelerate the setting of the resin. The catalyst may be any material which will cause the resin to set and form a strong bond between the coated particles. Such catalysts are well known in the art and include, for example, certain bases, amines, and strong organic acids. Specific catalysts include, for example, sodium hydroxide, 2,4,6-tri-(dimethylaminoethyl)-phenol, trichloroacetic acid and the like.

The consolidating composition is prepared in such a manner that a pumpable or pourable mixture of resin coated particles in a hydrocarbon carrier liquid is formed. The composition is prepared by first mixing the particulate material, e.g., sand, into a hydrocarbon carrier liquid, e.g., diesel oil. While continually agitating the mixture, a solution of the resin and oil miscible solvent is added. The resin solution and particulate material can also be added simultaneously if desired. However, if the resin is added first the oil miscible solvent is almost immediately extracted into the hydrocarbon carrier liquid leaving a very viscous mass of resin which does not readily and evenly coat particles added subsequently. The mixture is then pumped into the borehole in contact with the incompetent formation to be treated, e.g., wellbore, sand, soil or other.

The concentrations of the resin, oil miscible solvent, particulate material and carrier liquid can be varied over a wide range. The solution of the resin in the oil miscible solvent may contain up to the saturation level of the resin in a given amount of solvent. Generally, an operable resin solution contains from 10 to about 50 parts by volume of the resin and the balance an oil miscible solvent to make 100 parts. The maximum quantity of particulate material and resin to employ in the carrier liquid is that which allows the composition to be pumped under normal pumping conditions.

The compressive strength of the consolidated coated particles is dependent to some degree on the volume ratio of particulate material to the resin. A volume ratio of a phenol-formaldehyde resin to sand (20 to 40 mesh) of about 1 to 10 will provide a consolidated mass having a compressive strength of about 1000 psi. A volume ratio of such resin to sand of 1:5 will have a compressive strength of about 3000 psi and a ratio of 3:10 will have a compressive strength of about 4900 psi. To form a consolidated mass which is permeable to the flow of fluids the practical upper limit of volume ratio of resin to particulate material is about 4 to 1, preferably 1 to 2. The minimum volume ratio for sufficient compressive strength is about 1 to 20 resin to particulate material.

Sufficient carrier liquid is employed to form a mixture which can be readily pumped or otherwise forced into contact with the incompetent formation to be treated.

EXAMPLE 1

In this example, 170 grams of 20 to 40 mesh sand (about 100 mls.) was kept suspended in 500 mls. of diesel oil by an electric stirrer. About 10 mls. of a resin solution comprising 25 parts by volume of phenolformaldehyde resin, 75 parts of a 70:30 volume ratio solution of isopropanol and toluene was then added. The coating action occurred immediately. The agitation was continued for about 5 minutes and then the diesel oil was decanted. The coated sand was rinsed with 100 ml. of diesel oil containing about 1 percent by weight of an amine catalyst.

The treated sand was then tamped under diesel oil into a bottle, which was tightly capped. The bottle was then placed in a hot water bath (200°F.) for 24 hours. The compressive strength of the consolidated sand was then determined.

In a second and third test the same quantity of sand was treated with 20 and 30 mls., respectively, of an identical resin solution and the treated sand cured in a like manner. The compressive strengths of the three consolidated samples were respectively about 1000, 3100 and 4850 psi.

EXAMPLE 2

A resin solution containing about 25 percent by volume of formaldehyde-phenol-cresol resin, 65 percent by volume of a mixed alcohol solution of 75 percent by volume t-butyl alcohol and 25 percent by volume of isopropanol and 10 percent by volume toluene was prepared. In an 8 oz. wide mouth bottle containing 200 ml. of kerosene was stirred 8 ml. of the above described resin solution. The mixture was stirred for about five minutes. During this time the resin became very viscous and coalesced into a few masses. About 60 grams of sand (20 to 40 mesh) were added to the resin-kerosene mixture with stirring. The mixture was stirred for about five minutes. Very little of the sand became coated with the resin, and the mass was unsuitable for preparing a consolidated pack in a wellbore.

In a second 8 oz. bottle containing 200 ml. of kerosene were added with stirring 60 grams (20 to 40 mesh) sand, followed by 8 ml. of the same resin solution. The mixture was stirred for 5 minutes. Substantially all the sand grains were coated with a layer of viscous resin. The sand grains remained dispersed in the kerosene and did not coalesce together. This mixture is suitable for forming a sand pack in a wellbore.

What is claimed is:

1. A method for forming a consolidated particulate mass within a wellbore which is in communication with a subterranean permeable earth formation which comprises:

a. mixing into a hydrocarbon carrier liquid particulate solids and a solution of a hydroxylarylaldehyde curable resin in a solvent, said solvent being substantially completely soluble in said liquid hydrocarbon, said particulate material being mixed into said hydrocarbon liquid prior to or simultaneously with said resin solution, to form resin coated particulate material in said hydrocarbon carrier liquid, b. pumping said mixture down said well borehole, and c. screening out said coated particles on the face and in the voids of said permeable formation prior to the time said resin cures.

2. The method of claim 1 wherein the volume ratio of resin to particulate solids ranges from about 1:20 to about 4:1.

3. The method of claim 1 wherein the volume ratio of resin to particulate solids ranges from about 1:2 to about 1:20.

4. The method of claim 1 wherein the solvent comprises at least one of an aliphatic mono-alcohol containing from four to eight carbon atoms.

5. The method of claim 1 including in addition mixing with the resin solution an additional liquid solvent for said resin characterized as being substantially insoluble in said hydrocarbon carrier liquid in an amount of 1 percent or less by weight of said mixture.

6. The method of claim 5 wherein the insoluble solvent is present in an amount ranging from about 0.4 to about 0.6 percent by weight of said mixture.

7. The method as defined in claim 1 including contacting the emplaced mass of particles with a catalyst which accelerates the curing of the hydroxyaryl aldehyde resin.

8. The method of claim 1 including mixing in addition into said carrier liquid an effective amount of a coupling agent to enhance the bond between the set resin and the particulate solids.

9. The method of claim 8 wherein said coupling agent is a silane.

10. The method of claim 1 wherein said solvent is at least one of an aliphatic mono-alcohol containing from four to eight carbon atoms, including in addition mixing with said resin solution an additional solvent for said resin said additional solvent being insoluble in said carrier liquid.

* * * * *